(12) United States Patent
Sakai

(10) Patent No.: US 7,788,697 B2
(45) Date of Patent: Aug. 31, 2010

(54) DIGITAL BROADCAST RECEIVER APPARATUS, DIGITAL BROADCAST RECEIVING METHOD AND PROGRAM

(75) Inventor: Yuji Sakai, Kanagawa (JP)

(73) Assignee: Sony Corporation, Tokyo (JP)

( * ) Notice: Subject to any disclaimer, the term of this patent is extended or adjusted under 35 U.S.C. 154(b) by 1002 days.

(21) Appl. No.: 11/541,736

(22) Filed: Oct. 3, 2006

(65) Prior Publication Data

US 2007/0094696 A1 Apr. 26, 2007

(30) Foreign Application Priority Data

Oct. 20, 2005 (JP) ............................. 2005-306398

(51) Int. Cl.
*H04N 7/173* (2006.01)
(52) U.S. Cl. ........................ 725/118; 725/100; 725/131; 725/151; 725/120
(58) Field of Classification Search .................... 725/94, 725/120, 118, 119
See application file for complete search history.

(56) References Cited

U.S. PATENT DOCUMENTS

| 5,600,378 | A  | * | 2/1997  | Wasilewski | 348/468 |
| 5,666,645 | A  | * | 9/1997  | Thomas et al. | 725/47 |
| 6,181,921 | B1 | * | 1/2001  | Konisi et al. | 455/186.2 |
| 6,600,522 | B1 | * | 7/2003  | Kim | 348/732 |
| 7,086,076 | B1 | * | 8/2006  | Park | 725/50 |
| 7,197,688 | B2 | * | 3/2007  | Lee | 714/781 |
| 7,221,412 | B2 | * | 5/2007  | Shibusawa | 348/732 |
| 7,603,964 | B2 | * | 10/2009 | Jenkins et al. | 119/171 |
| 7,697,077 | B2 | * | 4/2010  | Van Horck | 348/731 |
| 2003/0197732 | A1 | * | 10/2003 | Gupta | 345/764 |
| 2004/0017831 | A1 | * | 1/2004  | Shen et al. | 370/486 |
| 2004/0107119 | A1 | * | 6/2004  | Ohishi | 705/2 |
| 2004/0143785 | A1 | * | 7/2004  | Lee | 714/781 |
| 2006/0053446 | A1 | * | 3/2006  | Kim et al. | 725/39 |
| 2006/0161425 | A1 | * | 7/2006  | Lee et al. | 704/201 |
| 2006/0253880 | A1 | * | 11/2006 | Bhakta et al. | 725/81 |

\* cited by examiner

*Primary Examiner*—Christopher Kelley
*Assistant Examiner*—Sahar A Baig
(74) *Attorney, Agent, or Firm*—Oblon, Spivak, McClelland, Maier & Neustadt, L.L.P.

(57) ABSTRACT

A digital broadcast receiver apparatus includes: a detection section that detects a receivable digital broadcast wave; a list production section that produces a list by associating pieces of provider information of a plurality of broadcast programs superposed on the digital broadcast wave with identifiers uniquely assigned to the broadcast programs and then sorting the pieces of provider information associated with the identifiers in predetermined order; an addition section that adds, if the identifiers of a currently-produced current list are the same as the identifiers of a previous list that was produced immediately before the current list, detailed information about the pieces of provider information to sub items associated with the identifiers; and a display control section that displays, based on the identifiers, the pieces of provider information of the list and contents of the sub items corresponding to the identifiers on a display screen.

17 Claims, 15 Drawing Sheets

| logical_channel_number | |
|---|---|
| 0 | NOT IN USE |
| 1 - 799 | TO BE ASSOCIATED WITH BROADCAST PROGRAMS |
| 800 - 999 | NOT IN USE |
| 1000 - 1023 | PRESERVED FOR POSSIBLE FUTURE USE |

FIG.2

| Field name | Field length in displayable characters | Comments and examples |
|---|---|---|
| Network Name | 24 | "Crystal Palace" |
| Service Provider Name | 20 | "BBC" |
| Service Name or Preferred Name | 32 | "BBC 1 North-East" Full name for display on set-up menus |
| | 8 | "BBC 1" A short version for display on browse and listing display. Shortened from full name by use of escape characters as defined in TR 101 211. |
| Event Name | 40 | "Casualty" Individual broadcasters are free to add an episode title to the title within the space, for example "Brit Girls: Marianne" |
| Short Event Description | 200 | "Out of control. When Mark steps in, he faces his own past and is forced to reveal a secret." Broadcasters must ensure that the text does not overflow the maximum descriptor size. |
| Extended Event Text | 3984 | The extended event text complements the short event description. |
| Component Description | 32 | "Casualty: guess the injury game" |

FIG.3

| | | PL | | | |
|---|---|---|---|---|---|
| 001 | BBC ONE | | Crystal Palace | 25ch | ~SU1 |
| 002 | BBC TWO | | Crystal Palace | 25ch | ~SU2 |
| 003 | Score digital | | Crystal Palace | 34ch | ~SU3 |
| 004 | Channel4 | | Crystal Palace | 22ch | ~SU4 |
| 005 | Five | | Crystal Palace | 32ch | ~SU5 |
| 006 | Yoomedia | | Crystal Palace | 29ch | ~SU6 |
| 007 | BBC THREE | | Crystal Palace | 25ch | ~SU7 |
| 008 | Channel4 Wales | | Crystal Palace | 22ch | ~SU8 |
| ⋮ | | | | | |
| 705 | ××× | | Crystal Palace | ◎ch | ~SUn |

FIG.4

| 001 | BBC ONE |
|---|---|
| 001 | BBC ONE |
| 001 | BBC ONE |
| 001 | BBC ONE |
| 001 | BBC ONE |
| 001 | BBC ONE |
| 001 | BBC ONE |
| 001 | BBC ONE |
| 002 | BBC TWO |
| 002 | BBC TWO |
| 002 | BBC TWO |
| 002 | BBC TWO |
| 002 | BBC TWO |
| 002 | BBC TWO |
| 002 | BBC TWO |

PLT (top), SAR (bracket covering the first 8 rows)

FIG.7

| | | | | |
|---|---|---|---|---|
| 001 | | BBC ONE | Crystal Palace | 25ch |
| 002 | | | Reigate | 31ch |
| 003 | Score digital | | | |
| 004 | Channel4 | | | |
| 005 | Five | | | |
| 006 | Yoomedia | | | |
| 007 | BBC THREE | | | |
| 008 | Channel4 Wales | | | |

| SI Table |
|---|
| NIT |
| BAT |
| SDT |
| EIT present/following |
| EIT schedule |
| TDT |
| TOT |
| RST |

| |
|---|
| network_name_descriptor |
| service_list_descriptor |
| terrestrial_delivery_system_descriptor |
| multilingual_network_name_descriptor |
| private_data_specifier_descriptor |
| frequency_list_descriptor |
| logical_channel_descriptor |
| service_attribute_descriptor |

FIG.11

| TRANSMISSION CHANNEL | BROADCAST PROGRAM NAME |
|---|---|
| ○△ch | A PROGRAM |
| | B PROGRAM |
| | C PROGRAM |
| | D PROGRAM |

DIGITAL BROADCAST

FIG.12A

| TRANSMISSION CHANNEL | BROADCAST PROGRAM NAME |
|---|---|
| ○△ch | X PROGRAM |

ANALOG BROADCAST

FIG.12B

| | |
|---|---|
| 1 | ITV 1 |
| 2 | ITV 3 |
| 3 | ITV 2 |
| 4 | Channel 4 |
| 5 | bloomberg |
| 6 | ITV NEWS |
| 7 | BBC ONE |

BROADCAST AREA A

| | |
|---|---|
| 23 | Sky News |
| 24 | Sky travel |
| 25 | UKTV Hits |

USUAL PROGRAM LIST

FIG.14A

| | |
|---|---|
| 1 | ITV 1 |
| 2 | ITV 3 |
| 3 | ITV 2 |
| 4 | Channel 4 |
| 5 | Bloomberg |
| 6 | ITV NEWS |
| 7 | BBC ONE |

BROADCAST AREA A

| | |
|---|---|
| 23 | Sky News |
| 24 | Sky travel |
| 25 | UKTV Hits |
| 26 | ITV 1 |
| 27 | ITV 3 |
| 28 | ITV 2 |
| 29 | Channel 4 |

BROADCAST AREA B

| | |
|---|---|
| 48 | Sky News |
| 49 | Sky travel |
| 50 | UKTV Hits |

PROGRAM LIST (PRESET IN TWO BROADCAST AREAS)

DIGITAL BROADCAST RECEIVER APPARATUS, DIGITAL BROADCAST RECEIVING METHOD AND PROGRAM

CROSS REFERENCES TO RELATED APPLICATIONS

The present invention contains subject matter related to Japanese Patent Application JP2005-306398 filed in the Japanese Patent Office on Oct. 20, 2005, the entire contents of which being incorporated herein by reference.

BACKGROUND OF THE INVENTION

1. Field of the Invention

The present invention relates to a digital broadcast receiver apparatus, digital broadcast receiving method and program, and is preferably applied for automatic station selecting, for example.

2. Description of the Related Art

As shown in FIG. 12, in a system of digital broadcast (FIG. 12A), broadcast programs from a plurality of broadcast stations are multiplexed on one transmission channel (a carrier frequency). This provides more information than a system of analog broadcast (FIG. 12B) in which one transmission channel (a carrier frequency) carries one broadcast program.

In the system of digital broadcast, each station is associated with a different transmission channel (a carrier frequency). As shown in FIG. 13, each base station T1 to T3 superposes a plurality of kinds of broadcast program data PD, which are supplied from an information source IS, on a carrier wave whose carrier frequency is associated with each base station. The stations T1 to T3 subsequently transmit the superposed carrier waves as digital broadcast waves BW1 to BW3. This prevents the digital broadcast waves BW1 to BW3 from interfering with one another.

However, for example, when a digital broadcast receiver device moves from a broadcast area of the base station T1 into a broadcast area of the base station T2, the digital broadcast receiver device may not be able to receive the digital broadcast wave BW2 from the base station T2 even if the base station T2 broadcasts the same program as the base station T1 does because the transmission channel of the base station T2 is different from that of the base station T1.

Accordingly, in the case of the typical digital broadcast receiver device, each time a user moves from one broadcast station T's area to a different broadcast station T's area, he/she has to tune the digital broadcast receiver device to a receivable program in that area, and this could be troublesome to set the device.

One way to solve the above problem is to use the following method: a digital broadcast receiver device registers information, such as program information, location information of transmission stations on Orthogonal Frequency Division Multiplexing (OFDM) modulated signal, and channel frequency information, on itself, and then, when a destination broadcast area broadcasts the same program, the digital broadcast receiver device automatically selects, based on the registered information and various information superposed on a signal received from the base stations, the same program in that area (see Jpn. Pat. Laid-open Publication No. H08-237570, for example).

Accordingly, even if a user moves into a different broadcast area, he/she can watch and listen to the same program there by the digital broadcast receiver device.

SUMMARY OF THE INVENTION

By the way, the registration method of program information and the like on the above digital broadcast receiver device is not clearly disclosed. Generally, the digital broadcast receiver device numbers each piece of program information of the broadcast program, which was received in a current broadcast area, consecutively in order of receiving to create a program list for each broadcast area as shown in FIG. 14.

In this case, a plurality of pieces of the program information is numbered consecutively in order of receiving. Therefore, a broadcast program which is broadcast in several broadcast areas may be associated with a different serial number in each area. This allows the user to watch the same program even when he/she moves into a different broadcast area. However, choosing a different program from a station selecting list could be troublesome.

FIG. 15 shows an example of the transmission situation of digital broadcast waves in and around London. There are nine base stations within 80 kms of London SP. Those stations transmit digital broadcast waves, which correspond to a plurality of transmission channels. Because twenty to thirty broadcast programs are superposed on one transmission channel, there are about 300 choices of broadcast programs in one broadcast area. Therefore, it is evident that selecting his/her desired program from the station selecting list is troublesome.

The present invention has been made in view of the above points and is intended to provide an easy-to-use digital broadcast receiver apparatus, digital broadcast receiving method and program.

In an embodiment of the present invention, a digital broadcast receiver apparatus includes: detection means for detecting a receivable digital broadcast wave; list production means for producing a list by associating pieces of provider information of a plurality of broadcast programs superposed on the digital broadcast wave with identifiers uniquely assigned to the broadcast programs and then sorting the pieces of provider information associated with the identifiers in predetermined order; addition means for adding, if the identifiers of a currently-produced current list are the same as the identifiers of a previous list that was produced immediately before the current list, detailed information about the pieces of provider information to sub items associated with the identifiers; and display control means for displaying, based on the identifiers, the pieces of provider information of the list and contents of the sub items corresponding to the identifiers on a display screen.

Accordingly, the digital broadcast receiver apparatus always displays, based on the identifiers uniquely assigned to the broadcast programs, the provider information and the corresponding detailed information in predetermined manner. Therefore, a user can intuitively understand the provider information and the corresponding detailed information.

In addition, in an embodiment of the present invention, a digital broadcast receiving method includes the steps of: detecting a receivable digital broadcast wave; producing a list by associating pieces of provider information of a plurality of broadcast programs superposed on the digital broadcast wave with identifiers uniquely assigned to the broadcast programs and then sorting the pieces of provider information associated with the identifiers in predetermined order; adding, if the identifiers of a currently-produced current list are the same as the identifiers of a previous list that was produced immediately before the current list, detailed information about the pieces of provider information to sub items associated with the identifiers; and displaying, based on the identifiers, the pieces of provider information of the list and contents of the sub items corresponding to the identifiers.

Accordingly, the digital broadcast receiving method always displays, based on the identifiers uniquely assigned to the broadcast programs, the provider information and the corresponding detailed information in predetermined manner. Therefore, a user can intuitively understand the provider information and the corresponding detailed information.

Furthermore, in an embodiment of the present invention, a program for causing a computer to execute the steps of: producing a list by associating pieces of provider information of a plurality of broadcast programs superposed on a digital broadcast wave with identifiers uniquely assigned to the broadcast programs and then sorting the pieces of provider information associated with the identifiers in predetermined order; adding, if the identifiers of a currently-produced current list are the same as the identifiers of a previous list that was produced immediately before the current list, detailed information about the pieces of provider information to sub items associated with the identifiers; and displaying, based on the identifiers, the pieces of provider information of the list and contents of the sub items corresponding to the identifiers.

Accordingly, the program always displays, based on the identifiers uniquely assigned to the broadcast programs, the provider information and the corresponding detailed information in predetermined manner. Therefore, a user can intuitively understand the provider information and the corresponding detailed information.

In this manner, the digital broadcast receiver apparatus, digital broadcast receiving method and program according to an embodiment of the present invention performs the process of: producing a list by associating pieces of provider information of a plurality of broadcast programs superposed on a digital broadcast wave with identifiers uniquely assigned to the broadcast programs and then sorting the pieces of provider information associated with the identifiers in predetermined order; adding, if the identifiers of a currently-produced current list are the same as the identifiers of a previous list that was produced immediately before the current list, detailed information about the pieces of provider information to sub items associated with the identifiers; and displaying, based on the identifiers, the pieces of provider information of the list and contents of the sub items corresponding to the identifiers. Accordingly, the digital broadcast receiver apparatus, digital broadcast receiving method and program always displays, based on the identifiers uniquely assigned to the broadcast programs, the provider information and the corresponding detailed information in predetermined manner. Therefore, a user can intuitively understand the provider information and the corresponding detailed information. This increases the usability.

The nature, principle and utility of the invention will become more apparent from the following detailed description when read in conjunction with the accompanying drawings in which like parts are designate by like reference numerals or characters.

BRIEF DESCRIPTION OF THE DRAWINGS

In the accompanying drawings:

FIG. 2 is a schematic diagram illustrating LCNs;

FIG. 3 is a schematic diagram illustrating a description example of PDSD;

FIG. 4 is a schematic diagram illustrating an example of a program list and list sub items;

FIG. 7 is a schematic diagram illustrating a program list sorted a plurality of times;

FIG. 9 is a schematic diagram illustrating a display format of the program list;

FIG. 11 is a schematic diagram illustrating table information in NIT;

FIG. 12 is a schematic diagram illustrating a difference between digital and analog broadcasting in terms of the number of programs;

FIG. 14 is a schematic diagram illustrating an example of creating a program list.

DETAILED DESCRIPTION OF THE PREFERRED EMBODIMENTS

An embodiment of the present invention will be described in detail with reference to the accompanying drawings.

(1) Overall Configuration of Digital Broadcast Receiver Device

Figure 1:
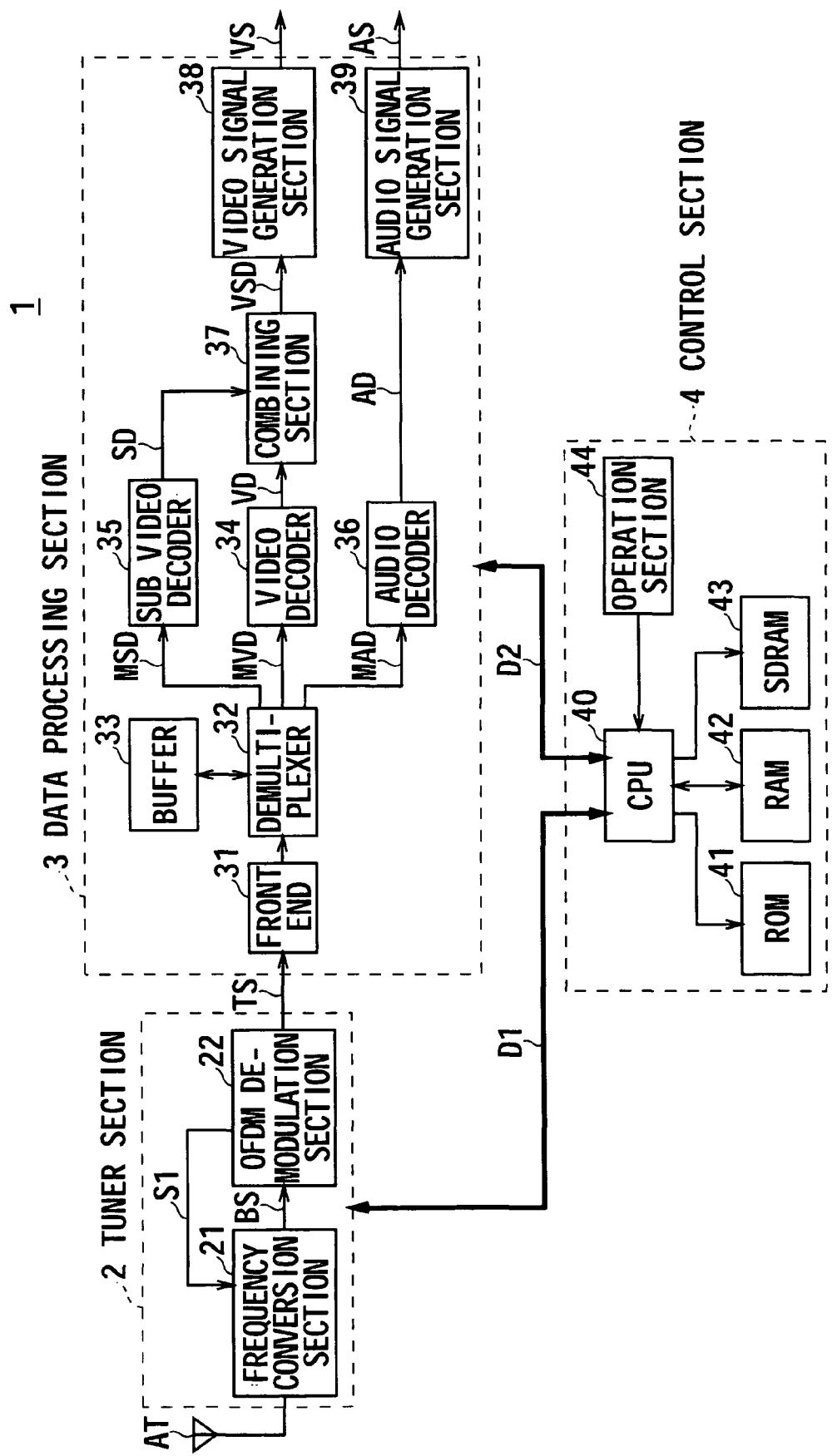
FIG. 1 is a block diagram illustrating a digital broadcast receiver device according to an embodiment of the present invention.

FIG. 1 shows a car-mounted digital broadcast receiver device 1. The digital broadcast receiver device 1 includes a tuner section 2, a data processing section 3, and a control section 4 that controls the tuner section 2 and the data processing section 3.

A plurality of digital broadcast waves from base stations in a broadcast area are supplied to the tuner section 2 through a car-mounted antenna AT. The control section 4 supplies frequency specification data D1 specifying a carrier frequency to the tuner section 2.

A frequency conversion section 21 of the tuner section 2 selects, out of the plurality of digital broadcast waves supplied from the car-mounted antenna AT, a digital broadcast wave BS corresponding to the carrier frequency specified by the frequency specification data D1, and then supplies the selected digital broadcast wave BS to an Orthogonal Frequency Division Multiplexing (OFDM) demodulation section 22. At this time, the frequency conversion section 21 controls, based on an AGC signal S1 fed back from the OFDM demodulation section 22, the output of the digital broadcast wave BS at a constant level.

The OFDM demodulation section 22 feeds back a difference between a signal level of the digital broadcast wave BS supplied from the frequency conversion section 21 and a predetermined signal level to the frequency conversion section 21 as the AGC signal S1. The OFDM demodulation section 22 also performs OFDM demodulation process on the digital broadcast wave BS to regenerate a Moving Picture Experts Group Layer-2 (MPEG2) transport stream (hereinafter simply referred to as a transport stream) TS from the digital broadcast wave BS, and then supplies the transport stream TS to a front end section 31 of the data processing section 3.

The front end section 31 performs various pre-processes, such as error correcting and descrambling, on the transport stream TS supplied from the tuner section 2, and then supplies the transport stream TS to a demultiplexer 32.

The demultiplexer 32 receives the transport stream TS from the front end section 31 and program specification data D2 from the control section 4. The demultiplexer 32 temporarily stores the transport stream TS in a buffer 33, and then reads out each part of the transport stream TS, which is a predetermined amount, from the buffer 33 in any order.

The demultiplexer 32 separates the following data from a plurality of broadcast program data superposed on the transport stream TS; MPEG video data MVD which corresponds to a broadcast program name indicated by the program specification data D2; MPEG sub data MSD including subtitles; and MPEG audio data MAD. The demultiplexer 32 then supplies the MPEG video data MVD, the MPEG sub data MSD and the MPEG audio data MAD to a video decoder 34, a sub video decoder 35, and an audio decoder 36, respectively.

The video decoder 34 performs, in accordance with the format of MPEG compression coding, a predetermined expansion process on the MPEG video data MVD to generate video data VD, and then supplies the video data VD to a combining section 37. The sub video decoder 35 performs, in accordance with the format of MPEG compression coding, a predetermined expansion process on the MPEG sub data MSD to generate sub data SD, and then supplies the sub data SD to the combining section 37.

The combining section 37 superposes the sub data SD on the video data VD to generate composite video data VSD, and supplies the composite video data VSD to a video signal generation section 38.

The video signal generation section 38 performs, for example, a predetermined format conversion process, such as Phase Alternation by Line (PAL) and National Television System Committee (NTSC) for television, on the composite video data VSD after performing Analog to Digital (A/D) conversion process. As a result of the format conversion process, the video signal generation section 38 obtains a video signal VS and then outputs the video signal VS to a car-mounted monitor (not shown).

In the meantime, the audio decoder 36 performs, in accordance with the format of MPEG compression coding, a predetermined expansion process on the MPEG audio data MAD to generate audio data VD, and then outputs the audio data AD to an audio signal generation section 39. The audio signal generation section 39 performs A/D process on the audio data AD to generate a audio signal AS, and then outputs the audio signal AS to the car-mounted monitor (not shown).

In this manner, the digital broadcast receiver device 1 allows a user to watch broadcast programs through the car-mounted monitor.

(2) Program List Generation Function

The above digital broadcast receiver device 1 further includes a program list generation function to generate a list of receivable broadcast programs in a current broadcast area (this list will be referred to as a program list).

In this embodiment, the control section 4 is equipped with the program list generation function. The control section 4 includes a Central Processing Unit (CPU) 40 which takes overall control of the digital broadcast receiver device 1. The CPU 40 is connected to a Read Only Memory (ROM) 41, a work memory of Random Access Memory (RAM) 42, a Synchronous Dynamic RAM (SDRAM) 43, and an operation section 44. The operation section 44 accepts various commands corresponding to user's operation.

The CPU 40 waits for a program list generation command from the operation section 44. While the CPU 40 is receiving a predetermined digital broadcast wave BS through the car-mounted antenna, the CPU 40 checks whether or not it moves into a different broadcast area based on the AGC signal S1, the state of the demodulation process on the digital broadcast wave BS (completed or uncompleted), and the state of the process of separating the MPEG data MVD, MSD and MAD from the transport stream TS on the digital broadcast wave BS (completed or uncompleted).

In a case in which the CPU 40 accepts the program list generation command; or the CPU 40 confirms that it has moved into a different broadcast area, the CPU 40 starts to perform, in accordance with a program in the ROM 41, a program list generation process by controlling the tuner section 2 and the data processing section 3.

Two types of the program list generation processes by the CPU 40 will be described: the program list generation process for the first time, and the subsequent program list generation process.

(2-1) First-Time Process of Generating Program List

In a case in which the CPU 40 accepts the program list generation command; or the CPU 40 confirms that it has moved into a different broadcast area, the CPU 40 starts to perform a process of changing receiving frequencies (this process will be referred to as a tuning process) by the frequency conversion section 21.

When starting the tuning process, the CPU 40 checks whether or not a receiving wave is the digital broadcast wave BS receivable in a current broadcast area based on a signal level of the received signal which is supplied to the OFDM demodulation section 22 through the car-mounted antenna AT and the frequency conversion section 21.

When the CPU 40 determines that the receiving wave is the digital broadcast wave BS, the CPU 40 controls the OFDM demodulation section 22 to start demodulation process and stops (locks) the tuning process of the frequency conversion section 21 until the demodulation process completes.

The transport stream TS, which is generated by the demodulation process while the tuning process is stopped, is temporarily stored in the buffer 33 through the front end 31 and the demultiplexer 32.

The CPU 40 checks, based on a table called Service Information (SI) which has been superposed on the transport stream TS (this table will be referred to as a SI table), various information related to a plurality of broadcast programs multiplexed on the transport stream TS.

That is to say, the CPU 40 checks, based on Program Identification (PID) which is associated with the SI table, a Logical Channel Number (LCN) and a transmission channel (carrier frequency) stored in the Network Information Table (NIT) of the Program Association Table (PAT). In addition, the CPU 40 checks other information such as a broadcast program name and a broadcast wave transmitting place described in the Private Data Specific Descriptor (PDSD) of the Program Map Table (PMT).

The LCN is defined by the standard for terrestrial digital video broadcasting. As shown in FIG. 2, each broadcast program is associated with a unique number. As shown in FIG. 3, the PDSD includes a broadcast wave transmitting place such as "Crystal Palace", a broadcast station name such as "BBC", and a broadcast program name such as "BBC 1 North-East".

As shown in FIG. 4, for example, the CPU 40 generates a program list PL by associating LCNs such as 001, 002, . . . with names of stations broadcasting corresponding broadcast programs (these names will be referred to as broadcast program names) such as BBC ONE, BBC TWO, . . . and then sorting them in ascending order. The CPU 40 subsequently stores data of the program list PL in the SDRAM 43.

At this time, the CPU 40 generates information of the broadcast wave transmitting place (Crystal Palace) and transmission channel (25ch) as sub items (also referred to as list sub items) SU1, SU2, . . . and SUn. The CPU 40 then associates the list sub items SU1 to SUn, which show detailed information of broadcast programs, with corresponding LCNs, and stores them in the SDRAM 43.

Figure 15:
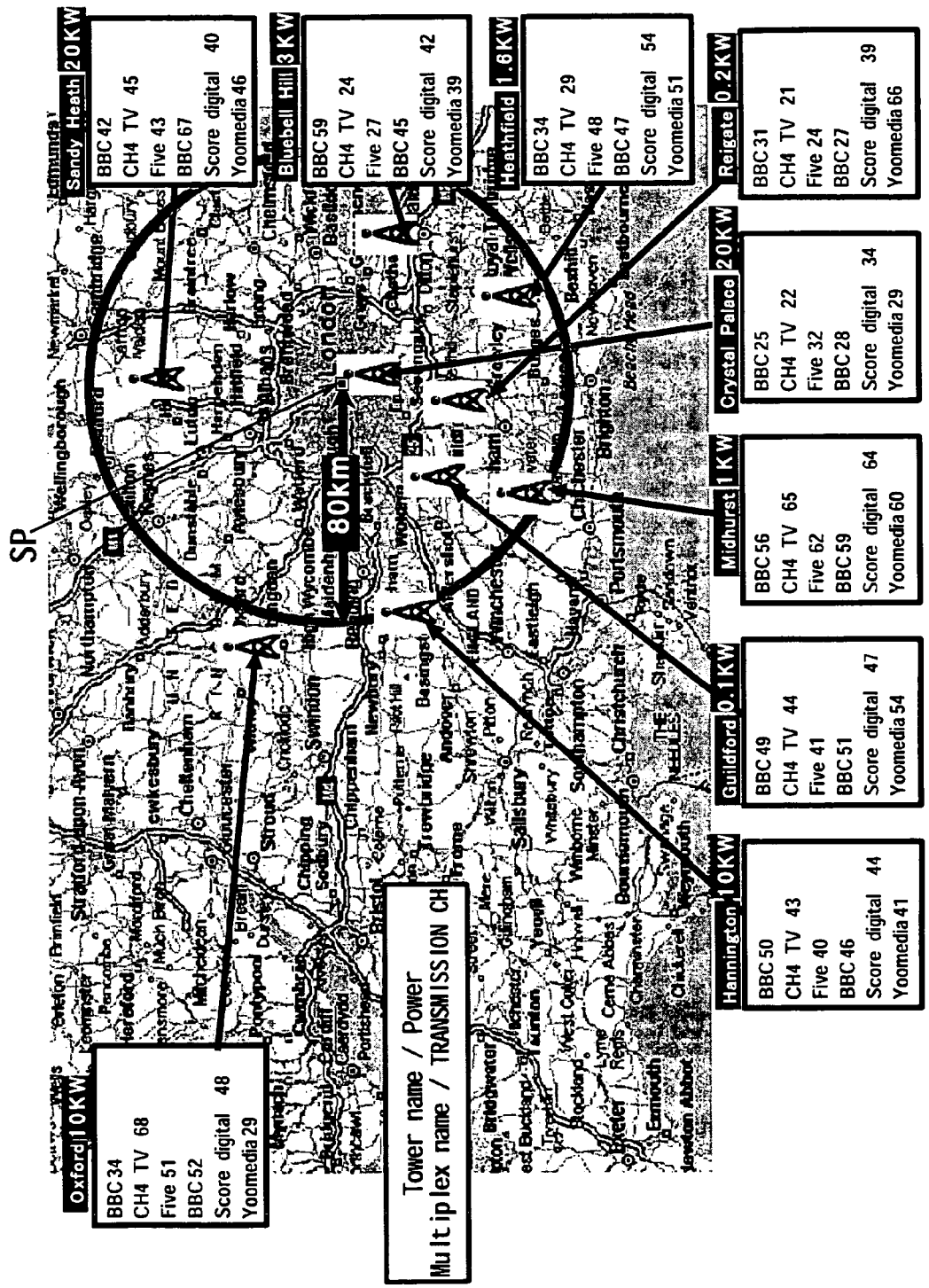
FIG. 15 is a schematic diagram illustrating a transmission state of digital broadcasting around London.

By the way, an example shown in FIG. 4 (the program list PL and list sub items SU1) is generated in a broadcast area of the base station of "Crystal Palace", which is one of the nine base stations shown in FIG. 15.

In this manner, the CPU 40 sequentially detects a plurality of digital broadcast waves BS which are transmitted through the receivable transmission channels in the current broadcast area, and demodulates the digital broadcast waves BS to obtain the transport stream TS. The CPU 40 then creates the program list PL of the current broadcast area based on the transport stream TS.

By the way, in a case in which a user inputs, through the operation section 44, a command for displaying the program list, the CPU 40 reads out the data of the program list PL from the SDRAM 43 to display the program list PL on the car-mounted monitor (not shown) as well as a cursor on the LCN.

When the user operates the operation section 44, the CPU 40 moves a cursor on broadcast programs one by one. When one of the LCNs is selected by the cursor, a corresponding transmission channel (carrier frequency) of the list sub item SU1, SU2, . . . or SUn is supplied to the frequency conversion section 21 as the frequency specification data D1 (FIG. 1). In addition, the broadcast program name corresponding to the selected LCN is supplied to the demultiplexer 32 as the program specification data D2 (FIG. 1).

As a result, in the digital broadcast receiver device 1, the video signal VS and audio signal AS of the broadcast program selected by the user are supplied to the car-mounted monitor (not shown). This allows him/her to view the selected broadcast program.

(2-2) Subsequent Process of Generating Program List

In a case in which the CPU 40 subsequently generates the program list, the CPU 40 performs similarly to the previous one: the CPU 40 controls the tuner section 2 and the data processing section 3 to generate a new program list and list sub items in a current broadcast area.

Figure 5A:
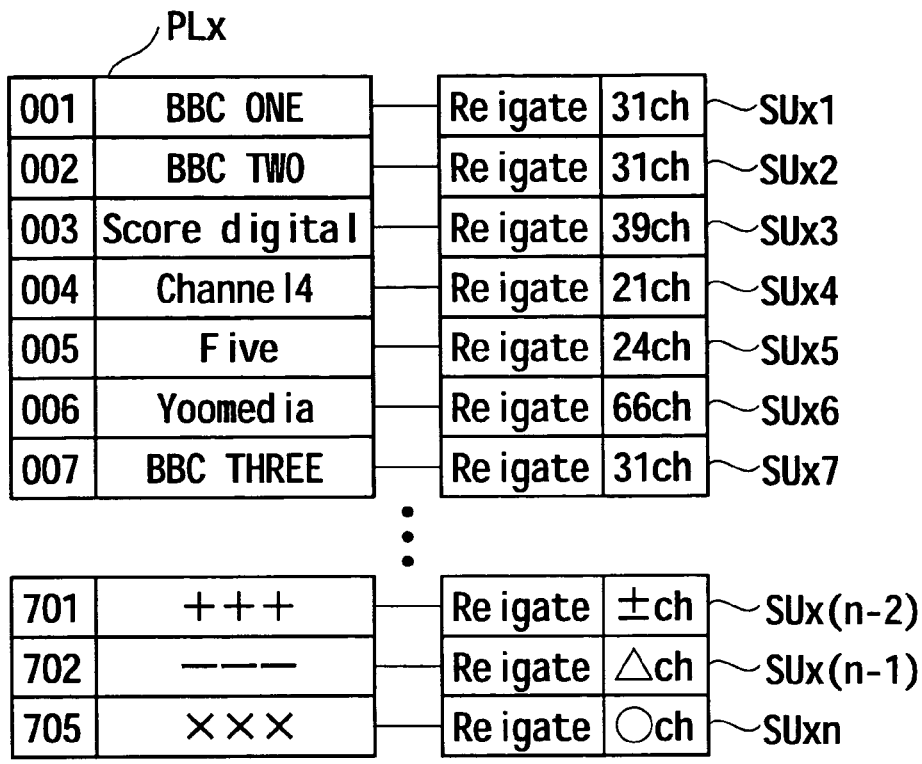
FIG. 5 is a schematic diagram illustrating a current program list and a previous program list.
Figure 5B:
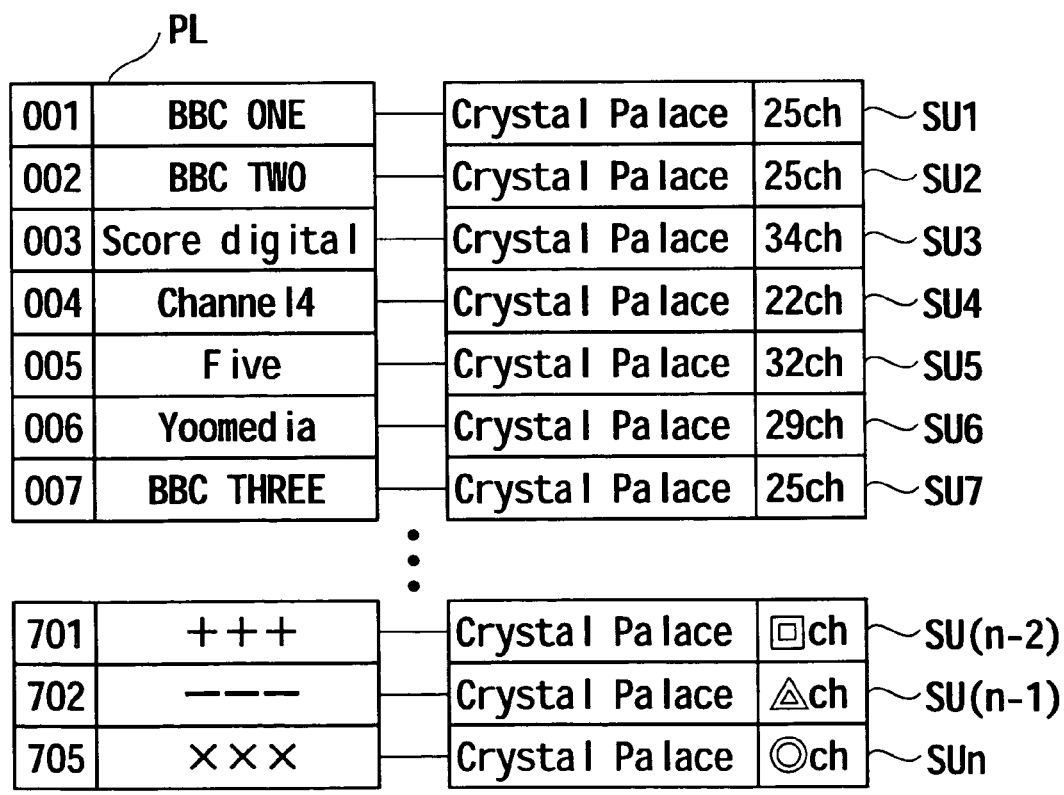

As shown in FIG. 5, in a case in which the SDRAM 43 stores the new (currently-produced) program list PLx and list sub items SUx1 to SUxn (FIG. 5A); and the previously-produced program list PL and list sub items SU1 to SUn (FIG. 5B), generally the program list PLx is the same as the program list PL while the list sub items SUx are different from the list sub items SU.

This wastes the SDRAM 43. In addition to that, to display the program list PLx or PL, a user has to select one of the program lists PLx or PL for a current broadcast area, and this could be troublesome. In this case, the user might not be able to choose a suitable one for the current broadcast area. The more program lists you have, the more troublesome it will be.

By the way, the program list PLx and the list sub titles SUx1 shown in FIG. 5A are generated in the broadcast area of the base station of "Reigate" shown in FIG. 15. As noted above in FIG. 4, the program list PL and the list sub titles SU1 shown in FIG. 5B are generated in the broadcast area of the base station of "Crystal Palace".

Figure 6:
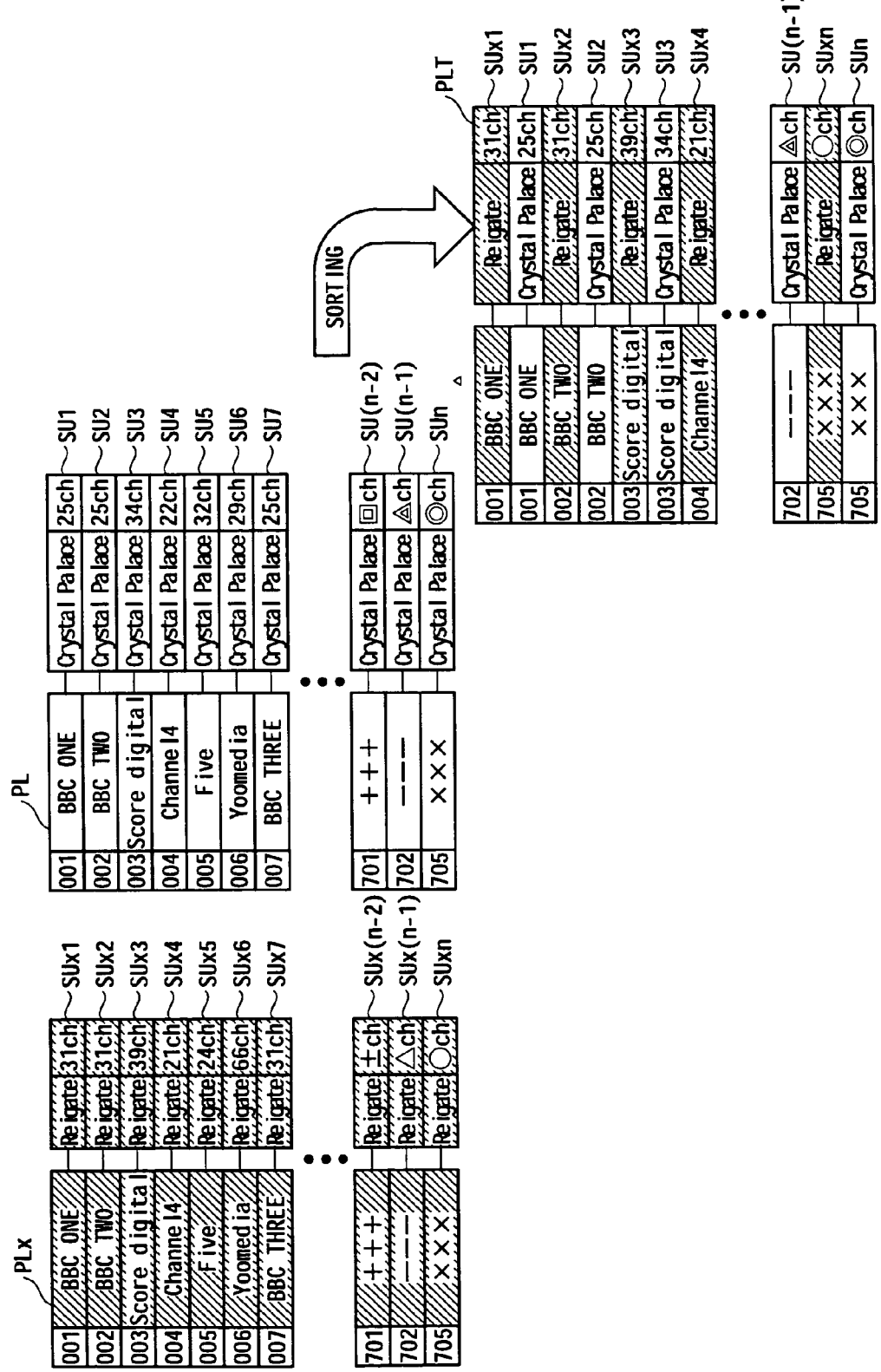
FIG. 6 is a schematic diagram illustrating the sorting of program lists.

As shown in FIG. 6, if a new program list PLT is generated by sorting both the current program list PLx and the previously-produced program list PL together in order of LCN, a user does not have to select one of the program lists PLx and PL for the current broadcast area, however other problems might not be solved.

In addition to that, as shown in FIG. 7, the number of the same broadcast program names which are listed consecutively in each LCN increases as the program list PLT is produced repeatedly. It could be troublesome to select his/her desired one from the broadcast program names of the program list PLT. This could be more troublesome especially when the size of a display area SAR, such as the car-mounted monitor, is limited.

Accordingly, in this embodiment, when producing the new program list PLx, the CPU 40 compares the LCNs of the new program list PLx with those of the previously-produced program list PL (which is the one stored in the SDRAM 43).

Figure 8:
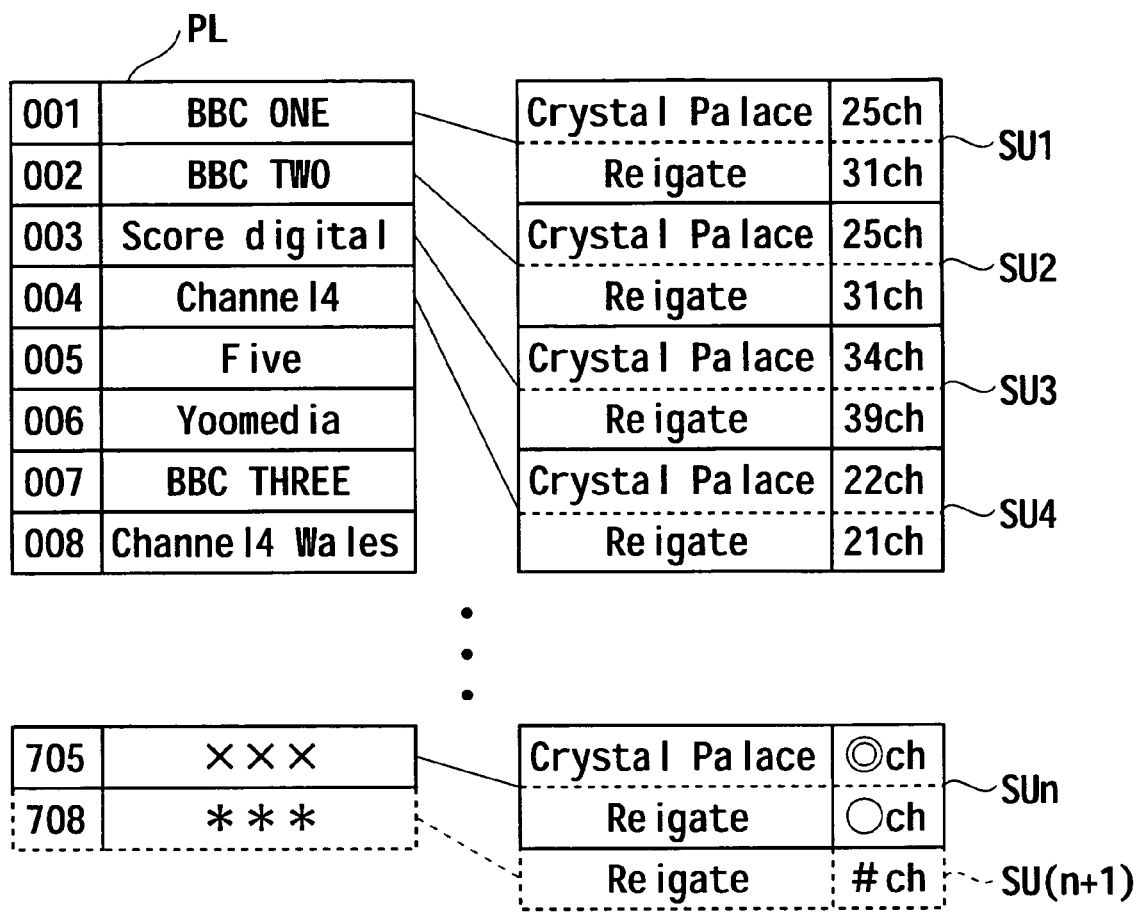
FIG. 8 is a schematic diagram illustrating an example of updating the program list and list sub items.

When there are not any different LCNs, then the CPU 40 abolishes the new program list PLx. Whereas when there are different LCNs, as shown in FIG. 8, the CPU 40 for example updates the program list PL stored in the SDRAM 43 by adding the LCN (708), which is different one, to the program list PL along with the corresponding broadcast program name (*). In addition, the CPU 40 associates list sub items SU(n+1) of a broadcast wave transmitting place (Reigate) and transmission channel (# ch), which correspond to the added broadcast program name (*), with the LCN (708) to store them in the SDRAM 43.

In addition to that, when producing the new program list PLx, the CPU 40 updates data of the list sub items SU1 to SUn by putting the contents (the broadcast wave transmitting place (Reigate) and the transmission channels (31ch, 31ch, 39ch, . . . and ±ch)) of the new list sub items SUx1 to SUxn (FIG. 5A), which are associated with the LCNs, into the corresponding list sub items SU1 to SUn.

In this manner, in a case in which the CPU 40 produces the subsequent program list, the CPU 40 adds the different parts to the program list PL and list sub items SU which have been stored in the SDRAM 43. This prevents the memory from being wasted.

After updating the program list PL, the CPU 40 displays, in response to the command for displaying the program list which is supplied from the operation section 44, the updated program list PL on the car-mounted monitor (not shown) in the same way as the previously-produced program list. The CPU 40 also displays a cursor on the LCN, and moves the cursor one by one in response to operation of the operation section 44.

In this case, as shown in FIG. 9, the CPU 40 for example displays the list sub item SU1 (the broadcast wave transmission place and transmission channel), which corresponds to the LCN focused by the cursor, as popup. In addition, out of the list sub item SU1, the CPU 40 highlights an area, which displays the broadcast wave transmitting place and transmission channel corresponding to the current broadcast area, by reverse video.

In this manner, the digital broadcast receiver device 1 always displays the LCNs, which are consistent both before and after updating; the associated broadcast programs; and the order of display. Therefore, a user can intuitively recognize whether or not new broadcast programs exist.

As for the LCN, the broadcast wave transmitting place and transmission channel of the corresponding broadcast program is displayed as popup. Therefore, a user can easily and intuitively recognize the past and current receiving state.

Furthermore, the broadcast wave transmitting place and transmission channel, which vary corresponding to broadcast areas, are set to be displayed as popup. Therefore, even if the size of the display area is limited, there is a high possibility that a user can see both the broadcast wave transmitting places and the transmission channels for each broadcast area at one time, compared to a method with no popup display. Therefore, a user can easily and intuitively recognize the past and current receiving state.

(2-3) Procedure of Program List Generation Process

Figure 10:
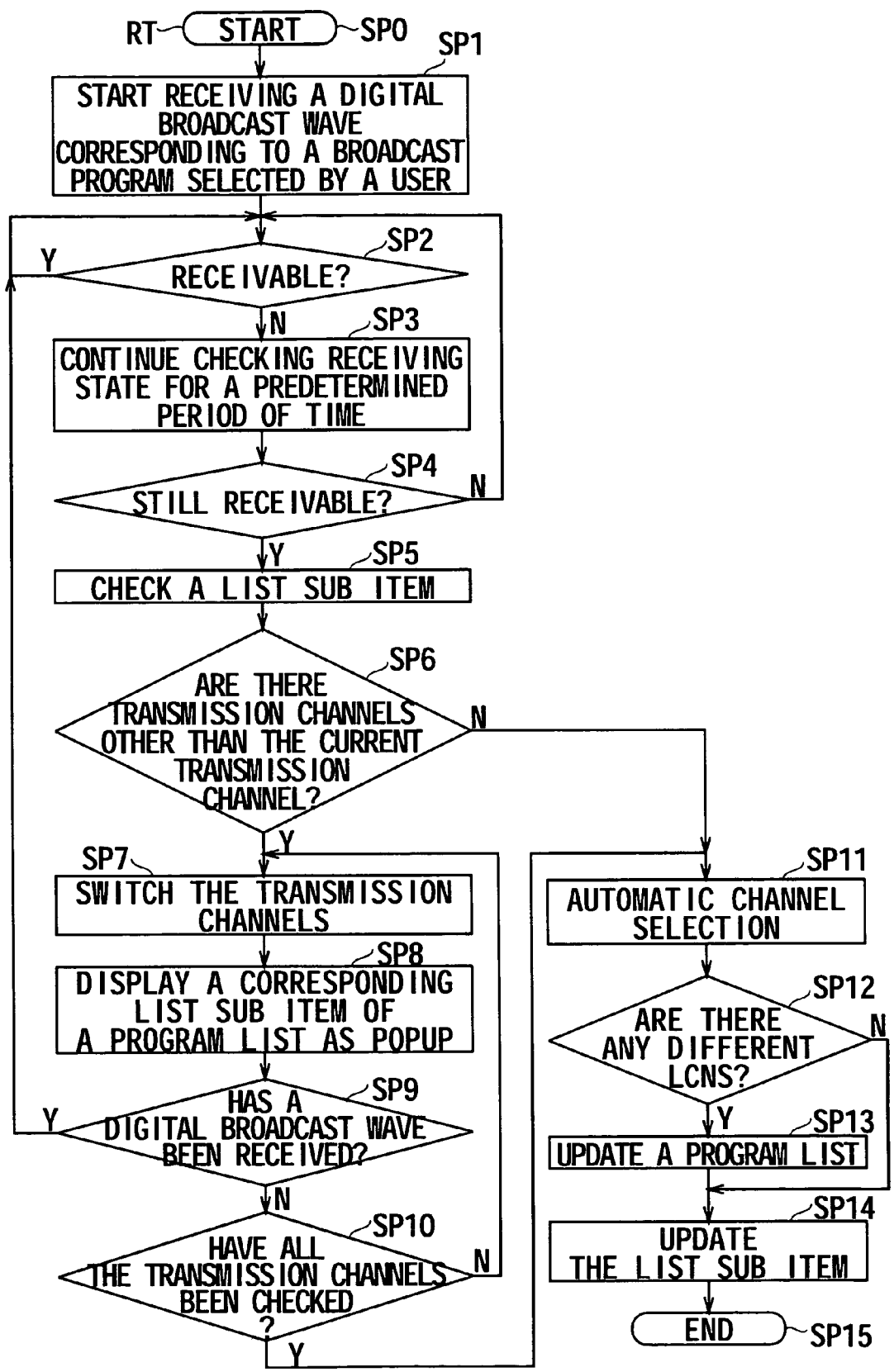
FIG. 10 is a flowchart illustrating a procedure of program list generation process.
Figure 13:
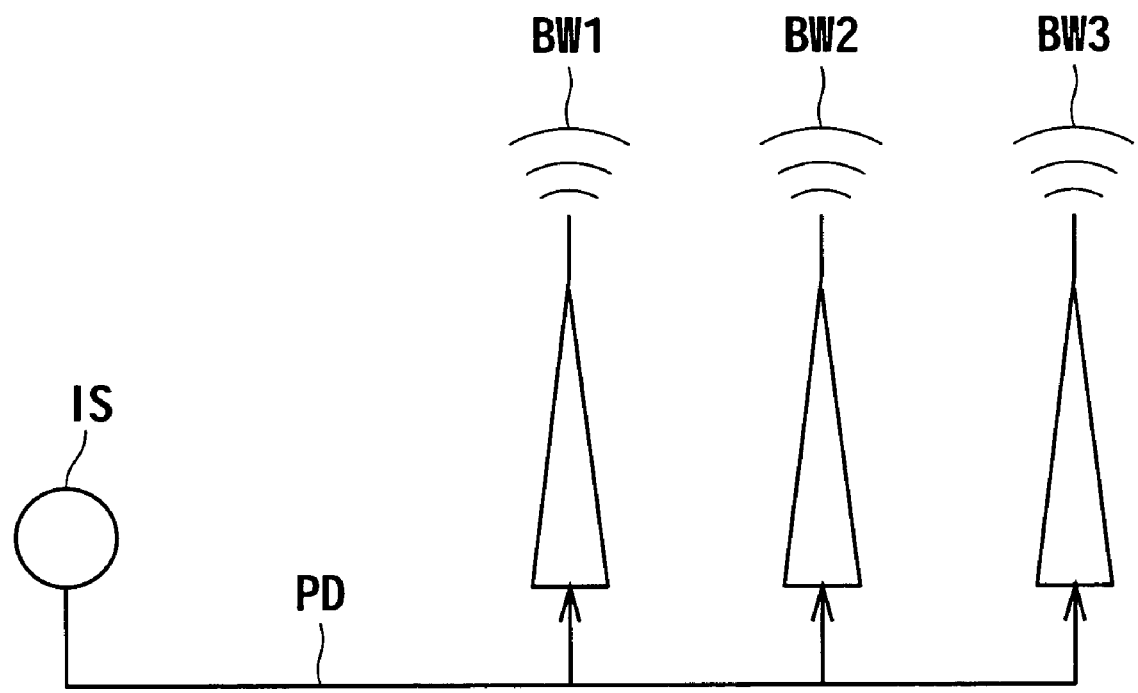
FIG. 13 is a schematic diagram illustrating a transmission method of digital broadcasting.

A procedure of the program list generation process will be described with reference to FIG. 10. In this case, the program list PL has been stored in the SDRAM 43, and a certain broadcast program, which is listed on the program list PL, is being received.

When a certain broadcast program is selected from the first program list PL, the CPU 40 starts the procedure RT of the program list generation process from step SP0. At step SP1, based on the program list PL (FIG. 8), the CPU 40 starts to receive the digital broadcast wave BS (FIG. 1) of the transmission channel (carrier frequency) of the selected broadcast program.

The CPU 40 at step SP2 checks, at predetermined intervals of time, whether or not the digital broadcast wave BS is receivable in a current broadcast area based on the signal level of the digital broadcast wave BS and the like. When the CPU 40 determines that the broadcast wave BS is not receivable, then the CPU 40 proceeds to next step SP3.

The CPU 40 at step SP3 continues checking whether or not the digital broadcast wave BS is receivable during a period of time from when the CPU 40 determines that at step SP2 until a predetermined time. At step SP4, after passing the period, the CPU 40 again checks whether or not the digital broadcast wave BS is receivable in the current broadcast area.

In a case in which the CPU 40 determines that the digital broadcast wave BS has been receivable in the current broadcast area before passing the period, this means that the device is located in tunnels and the like. In this case, the CPU 40 returns to step SP2 to repeat the above process.

By contrast, in a case in which the CPU 40 keeps determining that the digital broadcast wave BS is not receivable in the current broadcast area even after passing the period, this means that the device is located in a different broadcast area. In this case, the CPU 40 at step SP5 for example checks, out of the list sub items SU1 to SUn (FIG. 8) which are associated with the program list PL, the list sub item SU1 which is associated with the LCN of the currently-received broadcast program, and then proceeds to next step SP6.

In a case in which the CPU 40 at step SP6 determines that the list sub item SU1 checked at step SP5 includes not only the currently-received transmission channel but also other transmission channels, the CPU 40 at step SP7 switches the current transmission channel ("25ch" in FIG. 8, for example) to a different transmission channel ("31ch" in FIG. 8, for example) to receive the digital broadcast wave BS through the switched transmission channel.

And then, the CPU 40 at step SP8 displays the program list PL on the car-mounted monitor (not shown). The CPU 40 also displays the list sub item SU1 as popup, and highlights an area of the transmission channel switched at step SP7 by reverse video (FIG. 9).

In addition, the CPU 40 at step SP9 checks whether or not the digital broadcast wave BS, which the CPU 40 started to receive at step SP7, has been received. When the CPU 40 determines that the digital broadcast wave BS has been received, the CPU 40 returns to step SP2 to repeat the above process. By contrast, in a case in which the CPU 40 determines that the digital broadcast wave BS has not been received; and the CPU 40 at step SP10 determines that it has not checked receiving state (whether having received or not) of all the transmission channels in the list sub item SU1 yet, the CPU 40 returns to step SP7 to repeat the above process.

In this manner, in a case in which the list sub item SU1 includes not only the currently-received transmission channel but also other transmission channels, the CPU 40 checks receiving state (whether having received or not) of all the transmission channels (other than the currently-received channel) in the list sub item SU1, and also displays the process of checking. Accordingly, a user can recognize the fact that he/she has moved to a different broadcast area and where he/she has moved to, without operating anything.

On the other hand, in a case in which the CPU 40 determines that the list sub item SU1 does not include any transmission channels other than the transmission channel that has been received at step SP6; or the CPU 40 did not receive any transmission channels other than the currently-received transmission channel, this means that the user has moves into a broadcast area where the device has never received any broadcast waves. In this case, the CPU 40 proceeds to step SP11, and then notifies the user of the fact through the car-mounted monitor (not shown). At the same time, the CPU 40 starts to perform a process (automatic channel selection process) of searching receivable digital broadcast waves BS in this broadcast area.

Based on the result of the automatic channel selection process at step SP11, the CPU 40 at step SP12 creates a new program list PLx and list sub items SUx1 to SUxn (FIG. 5, for example). The CPU 40 then compares the LCNs of the program list PLx with those of the previously-produced program list PL (which is the one stored in the SDRAM 43) to check whether there are any different LCNs between those lists.

When there is a different LCN, the CPU 40 at step SP13 updates the program list stored in the SDRAM 43 by adding the different LCN and the corresponding broadcast program name to the program list PL in the same way as that of FIG. 8. The CPU 40 subsequently at step SP14 updates the list sub items SU1 to SUn stored in the SDRAM 43 by adding the contents of the corresponding list sub items SUx1 to SUxn. The CPU 40 then proceeds to step SP15 to end the procedure RT of the program list generation process.

Whereas when there are not any different LCNS, the CPU 40 deletes the program list PLx, and then proceeds to step SP14. At step SP14, the CPU 40 updates the list sub items SU1 to SUn stored in the SDRAM 43 by adding the contents of the corresponding list sub items SUx1 to SUxn. The CPU 40 then proceeds to step SP15 to end the procedure RT of the program list generation process.

In this manner, the CPU 40 can perform the program list generation process.

(3) Operation and Effect in the Present Embodiment

The digital broadcast receiver device 1 with the above configuration detects the receivable digital broadcast wave BS (FIG. 1). Based on the transport stream TS (FIG. 1) superimposed on the digital broadcast wave BS, the digital broadcast receiver device 1 checks the information about a plurality of broadcast programs which is multiplexed on the transport stream ST. The digital broadcast receiver device 1 then creates the program list PLx (FIG. 5) by associating the broadcast program names and LCNs and then sorting them in ascending order.

When the LCNs of the currently-produced program list PLx are the same as those of the program list PL that was produced immediately before the currently-produced program list PLx, the digital broadcast receiver device 1 adds the broadcast wave transmitting places and the transmission channels to the sub items SU1 to SUn associated with the LCNs (FIG. 8).

In a case in which the digital broadcast receiver device 1 accepts the command of displaying the program list; or the digital broadcast receiver device 1 determines that it has moved into a different broadcast area, the digital broadcast receiver device 1 displays, based on the LCNs, the program list PL on the display screen. At the same time, the digital broadcast receiver device 1 displays the corresponding sub items' (SU1, SU2, . . . or SUn) broadcast wave transmitting places and transmission channels as popup (FIG. 9).

Accordingly, the digital broadcast receiver device 1 always displays, based on the broadcast programs' unique LCNs, the broadcast programs, the broadcast wave transmitting places and the transmission channels in a predetermined format. Therefore, a user can intuitively recognize the broadcast programs, the broadcast wave transmitting places and the transmission channels.

The LCN, used not only for DVB-T but also other digital broadcasting standards operated by various countries, is applied to the digital broadcast receiver device 1. Therefore, a user can intuitively recognize the broadcast programs, the broadcast wave transmitting places and the transmission channels, wherever in the world the digital broadcast receiver device 1 is used.

In addition, the digital broadcast receiver device 1 utilizes the broadcast programs' unique LCNs to detect the same broadcast programs in different broadcast areas. Therefore, even if the LCNs associated with the broadcast programs are switched to different LCNS, the digital broadcast receiver device 1 can produce the program list PL. In addition to that, compared to the case in which the device utilizes the description of the NIT (FIG. 11) to detect the same broadcast programs in different broadcast areas, that dramatically reduces the processing load.

In this manner, the digital broadcast receiver device 1 provides various benefits by the LCNs.

Furthermore, the digital broadcast receiver device 1 displays the broadcast wave transmitting places and transmission channels corresponding to the broadcast programs as popup. Therefore a user can intuitively recognize the current and previous receiving state without performing troublesome operation.

Furthermore, in the digital broadcast receiver device 1, the broadcast wave transmitting places and transmission channels, which vary according to the broadcast areas, are displayed as popup. Therefore, even if the size of the display area is limited, there is a high possibility that a user will see both the broadcast wave transmitting places and the transmission channels for each broadcast area at once, compared to the device with no popup display. Therefore, the users can intuitively recognize the current and previous receiving state.

In this manner, the digital broadcast receiver device 1 with the above configuration creates a program list by associating broadcast program names with LCNs and then sorting them in predetermined order. When the LCNs of a current program list are the same as those of a previous program list that was produced immediately before the current program list, the digital broadcast receiver device 1 adds detailed information about broadcast program names to sub items associated with the LCNs, and, based on the LCNs, displays the broadcast program names of the list on a display screen as well as displaying the contents of the corresponding sub items as popup. Accordingly, the broadcast programs, the broadcast wave transmitting places and the transmission channels are always displayed in a predetermined format. Therefore a user can intuitively recognize the broadcast programs, the broadcast wave transmitting places and the transmission channels, and this increases the usability of the digital broadcast receiver device 1.

(4) Other Embodiments

In the above-noted embodiment, the program list PL is produced by associating station names of broadcast programs with the LCNs and then sorting them in ascending order. However the present invention is not limited to this. The station names of broadcast programs and the associated LCNs may be sorted in accordance with other predetermined rules: they may be sorted in descending order.

In the above-noted embodiment, the station names of broadcast programs are applied to as provider information about the program list PL. However, the present invention is not limited to this. Instead of or in addition to the station names, graphic symbols, marks and other things, indicating the broadcast program stations, may be applied.

In the above-noted embodiments, the LCN is applied to as an identifier uniquely assigned to a broadcast program in the program list PL. However, the present invention is not limited to this. Instead of or in addition to the LCN, an identifier uniquely assigned to the digital broadcast receiver device 1, unique biological information acquired from a living body and other things may be applied.

In addition, in the above-noted embodiment, the program list PL is generated by checking the transport stream TS superposed on the digital broadcast wave BS (FIG. 1) received through the car-mounted antenna AT. However, the present invention is not limited to this. A storage medium (such as Compact Disc (CD)), on which the program lists of each broadcast area and corresponding list sub items are recorded, may be previously prepared. In this case, each time the device detects that it has moved into a different broadcast area, the device reads out the corresponding broadcast area's program list and list sub items from the storage medium.

Furthermore, in the above-noted embodiment, an addition means, which adds, if an identifier of a currently-produced current list is the same as an identifier of a previous list that was produced immediately before the current list, detailed information about provider information to a sub item associated with the identifier, is designed to add the broadcast wave transmitting places and the transmission channels to the corresponding sub items SU1, SU2, . . . and SUn. However, the present invention is not limited to this. Instead of or in addition to the broadcast wave transmitting places and the transmission channels, the addition means may create location information of the broadcast wave transmitting places or event information on the broadcast programs in the corresponding sub items SU1, SU2, . . . and SUn.

In addition, for example, the digital broadcast receiver device 1 may associate the identifier with a first sub item, and then associate the first sub item with a second sub item. In this case, the digital broadcast receiver device 1 then associates the first sub item with the broadcast wave transmitting places and transmission channels as well as associating the second sub item with the location information of the broadcast wave transmitting places and the broadcast programs. In this manner, if they are sorted in hierarchical manner in accordance with their importance, the digital broadcast receiver device 1 can display those items in hierarchical manner as popup. Therefore a user can recognize each item's importance.

Furthermore, in the above-noted embodiment, the program list PL displays the station names of broadcast programs and the LCNs. However the present invention is not limited to this. The program list PL may only display the station names of broadcast programs. In this case, the program list PL may display a cursor on the station names of broadcast programs, which moves one by one in response to the operation of the operation section 44 to display the sub items SU1, SU2, . . . or SUn as popup in the similar way as the above embodiment. In this case, much more information can be displayed on the display screen because the LCNs have been omitted.

The above digital broadcast receiver device can be applied to receive digital broadcast waves: especially the digital broadcast receiver device can be applied to a mobile object receiving digital broadcast waves.

It should be understood by those skilled in the art that various modifications, combinations, sub-combinations and alterations may occur depending on design requirements and other factors insofar as they are within the scope of the appended claims or the equivalents thereof.

What is claimed is:

1. A digital broadcast receiver apparatus, comprising:
   detection means for detecting a receivable digital broadcast wave;
   list production means for producing a list by associating provider information of a plurality of broadcast programs superposed on said digital broadcast wave with Logical Channel Numbers (LCNs) uniquely assigned to said plurality of broadcast programs and sorting the provider information associated with the LCNs in a predetermined order;
   addition means for adding, if the LCNs of a current list are the same as the LCNs of an immediately previous list that was produced before the current list, to the immediately previous list, sources of digital broadcast waves associated with said LCNs of the current list; and
   display control means for displaying, based on said LCNs of said list, said provider information of said list and the sources of said digital broadcast waves corresponding to said LCNs of the current list on a display screen.

2. The digital broadcast receiver apparatus according to claim 1, wherein said order is an ascending or a descending order.

3. The digital broadcast receiver apparatus according to claim 1, wherein, if there is a different LCN between the current list and the immediately previous list, said addition means adds said different LCN and corresponding provider information of a broadcast program to said immediately previous list.

4. The digital broadcast receiver apparatus according to claim 1, wherein said addition means adds at least a transmission channel to the immediately previous list.

5. The digital broadcast receiver apparatus according to claim 1, wherein, based on said LCNs of said list, said display control means displays said provider information of said list, the sources of said digital broadcast waves of said current list corresponding to said LCNs of said list, and sources of digital broadcast waves of said previous list corresponding to said LCNs of said list, on the display screen.

6. The digital broadcast receiver apparatus according to claim 1, wherein, based on said LCNs of said list, said display control means displays said provider information of said list on the display screen, and displays the sources of said digital broadcast waves corresponding to said LCNs of the current list as a popup.

7. The digital broadcast receiver apparatus according to claim 6, wherein said display control means displays, out of said sources of said digital broadcast waves displayed as the popup, a most-recently added one of said sources of said digital broadcast waves in reverse video.

8. The digital broadcast receiver apparatus according to claim 6, wherein, when digital broadcast waves of one of the plurality of broadcast programs, which is listed in said list, are being searched, said display control means displays sources of the digital broadcast waves associated with an LCN of the one of the plurality of broadcast programs as a popup, and displays, out of said sources of the digital broadcast waves associated with the LCN, one of the sources of the digital broadcast waves corresponding to said one of the plurality of broadcast programs in reverse video.

9. A digital broadcast receiving method implemented by a digital broadcast receiver device, the digital broadcast receiving method comprising:
   detecting a receivable digital broadcast wave;
   producing a list by associating provider information of a plurality of broadcast programs superposed on said digital broadcast wave with Logical Channel Numbers (LCNs) uniquely assigned to said plurality of broadcast programs and sorting the provider information associated with the LCNs in a predetermined order;
   adding, if the LCNs of a current list are the same as the LCNs of an immediately previous list that was produced before the current list, to the immediately previous list, sources of said digital broadcast waves associated with said LCNs of the current list; and
   with the digital broadcast receiver device, displaying, based on said LCNs of said list, said provider information of said list and the sources of said digital broadcast waves corresponding to said LCNs of the current list.

10. The digital broadcast receiving method according to claim 9, wherein, if there is a different LCN between the current list and the immediately previous list, said different LCN and corresponding provider information of a broadcast program are added to said immediately previous list.

11. The digital broadcast receiving method according to claim 9, wherein said adding adds at least a transmission channel to the immediately previous list.

12. The digital broadcast receiving method according to claim 9, wherein, based on said LCNs of said list, said provider information of said list, the sources of said digital broadcast waves of said current list corresponding to said LCNs of said list, and sources of digital broadcast waves of said previous list corresponding to said LCNs of said list, are displayed on a display screen.

13. The digital broadcast receiving method according to claim 9, wherein, based on said LCNs of said list, said displaying displays said provider information of said list on a display screen, and displays the sources of said digital broadcast waves corresponding to said LCNs of the current list as a popup.

14. The digital broadcast receiving method according to claim 13, wherein, out of said sources of said digital broadcast waves displayed as the popup, a most-recently added one of said sources of digital broadcast waves is displayed in reverse video.

15. The digital broadcast receiving method according to claim 13, wherein, when digital broadcast waves of one of the plurality of broadcast programs, which is listed in said list, are being searched, sources of the digital broadcast waves associated with an LCN of the one of the plurality of broadcast programs are displayed as a popup, and, out of said sources of the digital broadcast waves associated with the LCN, one of the sources of the digital broadcast waves corresponding to said one of the plurality of broadcast programs is displayed in reverse video.

16. A computer-readable non-transitory storage medium encoded with a program, the program, when executed by a computer, causing the computer to execute operations of:
   producing a list by associating provider information of a plurality of broadcast programs superposed on a digital broadcast wave with Logical Channel Numbers (LCNs) uniquely assigned to said plurality of broadcast programs and sorting the provider information associated with the LCNs in a predetermined order;
   adding, if the LCNs of a current list are the same as the LCNs of an immediately previous list that was produced before the current list, to the immediately previous list, sources of said digital broadcast waves associated with said LCNs of the current list; and
   displaying, based on said LCNs of said list, said provider information of said list and the sources of said digital broadcast waves corresponding to said LCNs of the current list.

17. A digital broadcast receiver apparatus, comprising:
   a detection section that detects a receivable digital broadcast wave;
   a list production section that produces a list by associating provider information of a plurality of broadcast programs superposed on said digital broadcast wave with Logical Channel Numbers (LCNs) uniquely assigned to said plurality of broadcast programs and sorting the provider information associated with the LCNs in a predetermined order;
   an addition section that adds, if the LCNs of a current list are the same as the LCNs of an immediately previous list that was produced before the current list, to the immediately previous list, sources of said digital broadcast waves associated with said LCNs of the current list; and
   a display control section configured to display, based on said LCNs of said list, said provider information of said list and the sources of said digital broadcast waves corresponding to said LCNs of the current list on a display screen.

* * * * *